(12) United States Patent
Fujiki

(10) Patent No.: US 6,701,213 B2
(45) Date of Patent: Mar. 2, 2004

(54) DATA REGISTRATION METHOD FOR MOLDING SYSTEM INCLUDING TAKE-OUT MACHINE

(75) Inventor: Kenji Fujiki, Nagano (JP)

(73) Assignee: Nissei Plastic Industrial Co., Ltd., Nagano-Ken (JP)

( * ) Notice: Subject to any disclaimer, the term of this patent is extended or adjusted under 35 U.S.C. 154(b) by 0 days.

(21) Appl. No.: 10/271,597

(22) Filed: Oct. 17, 2002

(65) Prior Publication Data

US 2003/0074103 A1 Apr. 17, 2003

(30) Foreign Application Priority Data

Oct. 17, 2001 (JP) .......................... 2001-319764

(51) Int. Cl.[7] .................. B29C 45/07; B28B 13/06
(52) U.S. Cl. .................. 700/200; 264/334; 425/444; 425/537
(58) Field of Search .................. 264/334; 425/556, 425/150, 444, 537; 700/197, 200

(56) References Cited

U.S. PATENT DOCUMENTS

| | | | | |
|---|---|---|---|---|
| 5,736,079 A | * | 4/1998 | Kamiguchi et al. | 425/556 |
| 5,772,932 A | * | 6/1998 | Kamiguchi et al. | 425/150 |
| 6,054,075 A | * | 4/2000 | Inaba et al. | 264/334 |
| 6,485,285 B1 | * | 11/2002 | Shiotani | 425/556 |

FOREIGN PATENT DOCUMENTS

JP 11-58466 3/1999

* cited by examiner

*Primary Examiner*—Albert W. Paladini
(74) *Attorney, Agent, or Firm*—Birch, Stewart, Kolasch & Birch, LLP

(57) ABSTRACT

In a data registration method for a molding system including a molding machine and a take-out machine, after completion of operation of setting molding conditions for the molding machine and operation of setting take-out conditions for the take-out machine, data of the molding conditions and data of the take-out conditions are registered in a memory unit provided in the molding machine, while being interrelated.

6 Claims, 5 Drawing Sheets

FIG.5

|  | FIRST SWITCH | |
|---|---|---|
|  | ON (CLOSE) | OFF (OPEN) |
| MOLD CLAMP INTERLOCK | OPEN | CLOSE |
| MOLD OPEN INTERLOCK | OPEN | CLOSE |
| CYCLE START | OPEN | CLOSE |
| START OF EJECTOR ADVANCEMENT | OPEN | CLOSE |
| OTHER INTERLOCKS | OPEN | CLOSE |

FIG.6

| CORRECTION AND CHANGE OF TEACHING DATA | | |
|---|---|---|
| CORRECTION AND CHANGE OF POSITIONS | CORRECTION AND CHANGE OF SPEEDS | CORRECTION AND CHANGE OF TIMERS |
| DECENT START POSITION FOR TAKE-OUT | DECENT SPEED FOR TAKE-OUT | DESCENT START WAIT TIMER FOR TAKE-OUT |
| DESCENDED POSITION FOR TAKE-OUT | APPROACH SPEED | APPROACH WAIT TIMER |
| APPROACH POSITION FOR TAKE-OUT | PULL-OUT SPEED | PRODUCT GRASP START TIMER |
| PULL-OUT POSITION FOR TAKE-OUT | ASCENT SPEED FOR TAKE-OUT | PULL-OUT START TIMER |
| ASCENT START POSITION FOR TAKE-OUT | TAKE-OUT POSITION MOVING SPEED | ASCENT START TIMER FOR TAKE-OUT |
| ASCENDED POSITION FOR TAKE-OUT | DECENT SPEED FOR DISCHARGE | TAKE-OUT POSITION MOVING START TIMER |
| DECENT START POSITION FOR DISCHARGE | ASCENT SPEED FOR DISCHARGE | DESCENT START TIMER FOR DISCHARGE |
| DESCENDED POSITION FOR DISCHARGE | DISCHARGE POSITION MOVING SPEED | PRODUCT RELEASE START TIMER |
|  |  | ASCENT START TIMER FOR TAKE-OUT |
|  |  | DISCHARGE POSITION MOVING START TIMER |

DATA REGISTRATION METHOD FOR MOLDING SYSTEM INCLUDING TAKE-OUT MACHINE

This non-provisional application claims priority under 35 U.S.C. § 119(a) on Patent Application No. 2001-319764 filed in JAPAN on Oct. 17, 2001, which is herein incorporated by reference.

BACKGROUND OF THE INVENTION

1. Field of the Invention

The present invention relates to a data registration method for a molding system including a molding machine and a take-out machine for taking molded products out of the molding machine.

2. Description of the Relevant Art

Conventionally, there has been known an injection molding system which consists of an injection molding machine and a take-out machine (a take-out robot) for automatically taking molded products out of the molding machine, as disclosed in, for example, Japanese Patent Application Laid-Open (kokai) No. 11(1999)-58466.

Since such a take-out machine is generally an optional unit for injection molding machines (molding machines), it is often attached to an injection molding machine after manufacture of the molding machine, and in some cases, the manufacturer of the take-out machine differs from that of the injection molding machine. Therefore, when a take-out machine is attached to a molding machine, a controller for the molding machine (hereinafter referred to as a "molding machine controller") is connected to a controller for the take-out machine (hereinafter referred to as a "take-out machine controller") by means of a connection cable, and operation of the molding machine and operation of the take-out machine are interrelated by means of interlocking. Moreover, since the molding machine controller and the take-out machine controller are separated from each other, molding conditions are set by use of an operation section connected to the molding machine controller, and take-out conditions are set by use of an operation section (e.g., operation pendant) connected to the take-out machine controller.

However, such a conventional molding system has the following drawbacks. Setting operation must be performed individually for each of the molding machine controller and the take-out machine controller; and data regarding molding conditions must be registered in a memory unit of the molding machine controller, whereas data regarding take-out conditions must be registered in a memory unit of the take-out machine controller. Therefore, when registered data regarding molding conditions and take-out conditions are to be used again, the corresponding molding conditions data must be searched from the memory unit of the molding machine controller, and the corresponding take-out conditions data must be searched from the memory unit of the take-out machine controller, and data changing operation must be performed independently for the molding conditions data and the take-out conditions data, raising problems in that work of re-using the registered data becomes difficult or inconvenient, work efficiency lowers, and operational errors may occur.

SUMMARY OF THE INVENTION

An object of the present invention is to provide a data registration method for a molding system including a take-out machine, which method can enhance convenience at the time of re-use of data.

Another object of the present invention is to provide a data registration method for a molding system including a take-out machine, which method can improve work efficiency and eliminates operational errors.

In order to achieve the object as described above, the present invention provides an improved data registration method for a molding system including a molding machine and a take-out machine for taking molded products out of the molding machine. In the method, after completion of operation of setting molding conditions for the molding machine and operation of setting take-out conditions for the take-out machine, the take-out conditions corresponding to the molding conditions, data of the molding conditions and data of the take-out conditions are registered in a memory unit provided in the molding machine, while being interrelated.

BRIEF DESCRIPTION OF THE DRAWINGS

FIG. 5 is a table showing the relation between open/close states of the first switch and open/close states of interlock signal lines in the take-out machine connection apparatus; and FIG. 6 is a table showing items of teaching data for the take-out machine of the molding system which are to be corrected and/or changed.

DETAILED DESCRIPTION OF THE PREFERRED EMBODIMENT

An embodiment of the present invention will next be described in detail with reference to the drawings. The accompanying drawings are illustrative of the embodiment and are not meant to limit the scope of the invention. In order to describe the invention clearly, detailed description of known features is omitted.

First, the configuration of a molding system M in which a data registration method of the present embodiment can be practiced will be described with reference to FIGS. 2 to 5.

Figure 2:
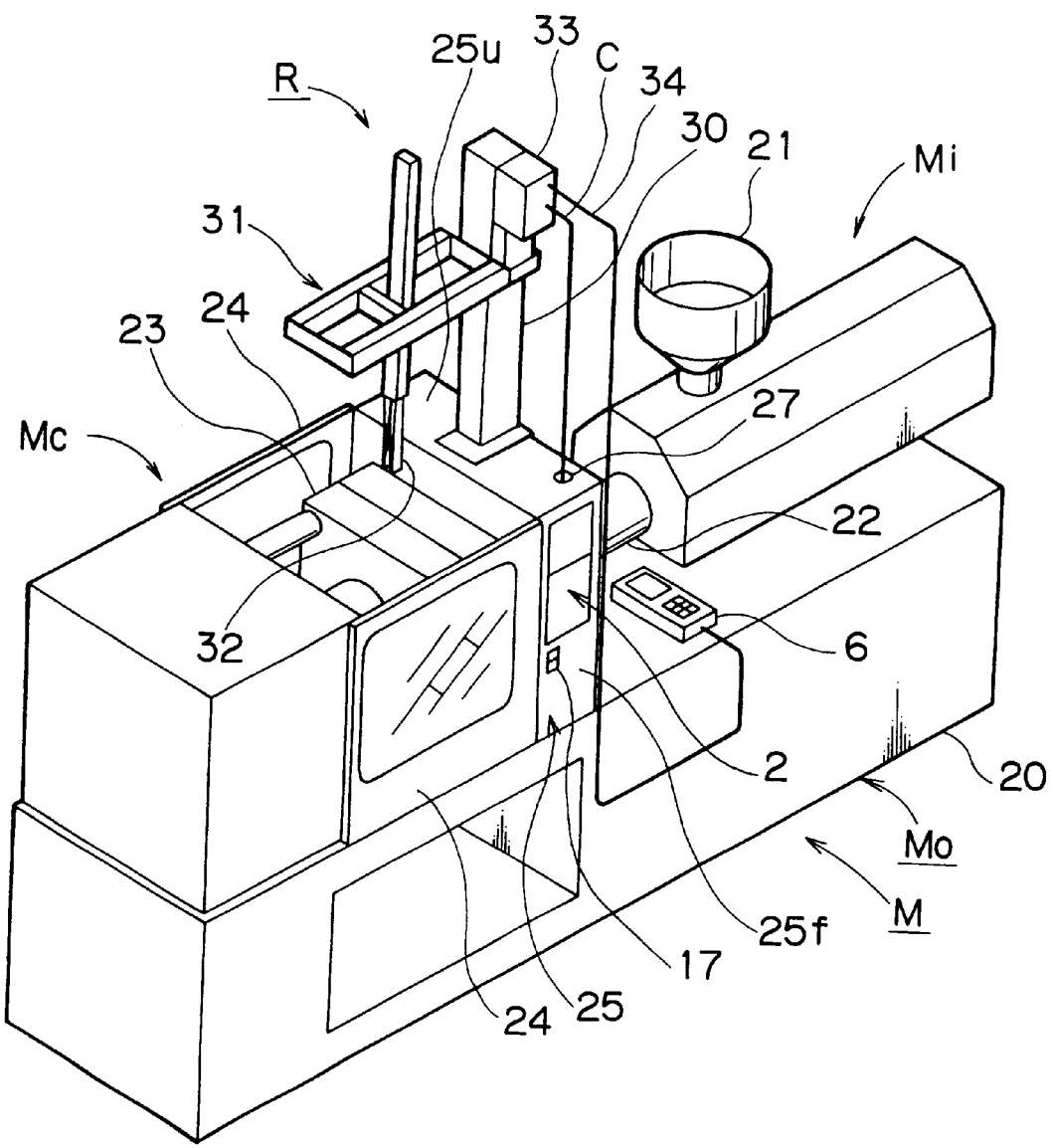
FIG. 2 is a perspective view of the molding system.

FIG. 2 shows the structure of the molding system M which includes a molding machine Mo and a take-out machine R attached to the molding machine Mo. The molding machine Mo has a machine base 20. An injection apparatus Mi having a hopper 21 and a heating barrel 22 is disposed on the top face of the machine base 20 to be located on one side thereof, and a mold clamp apparatus Mc supporting a movable half of a mold 23 is disposed on the top face of the machine base 20 to be located on the other side thereof. A slide-type safety door 24 is provided on each of opposite sides of the mold 23. A housing 25 is disposed in the vicinity of a stationary platen supporting a stationary half of the mold 23; and an operation section 2 is provided on a front panel portion 25f of the housing 25. The operation section 2 includes a display and a keyboard.

Figure 3:
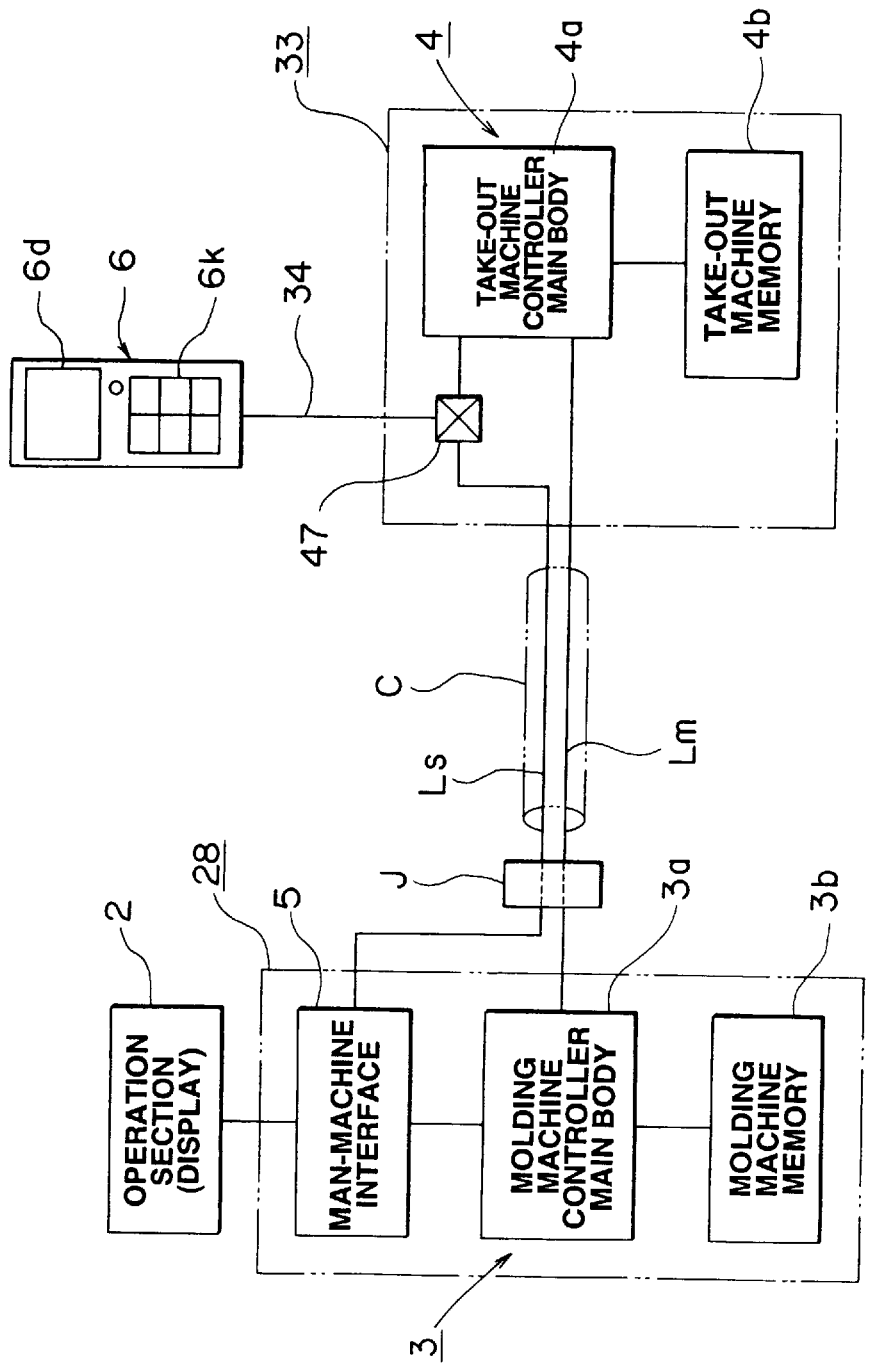
FIG. 3 is a block diagram of a control system of the molding system.

Meanwhile, the take-out machine R has a mount base 30, whose upper portion supports one end of an arm mechanism section 31. This configuration enables the arm mechanism section 31 to swing about a point of support on the mount base 30. The arm mechanism section 31 supports a chuck 32 capable of grasping and releasing a molded product. The chuck 32 is moved along the X-direction, the Y-direction, and the Z-direction by means of the arm mechanism section 31. The mount base 30 is fixedly attached to a top panel portion 25u of the housing 25. Further, a take-out machine controller unit 33 for the take-out machine R is attached to the upper end of the mount base 30. A pendant cable 34 is extended from the take-out machine controller unit 33; and an operation pendant 6 for manually operating the take-out machine R is connected to the end of the pendant cable 34. As shown in FIG. 3, the operation pendant 6 is equipped with a display 6d and a keyboard 6k.

A connection cable C to be connected to the molding machine Mo is extended from the take-out machine controller unit 33. No plug is present at the end of the connection cable C. Depending on manufacturer or type, a plug may be attached to the end of the connection cable C. In such a case, the plug is cut and removed from the connection cable C. The tip end of the connection cable C is introduced into the machine base 20 via, for example, a hole 27 formed in the top panel portion 25u and is connected to a molding machine controller unit 28 via a take-out machine connection apparatus J, which is disposed within the machine base 20 (see FIG. 3).

Figure 4:
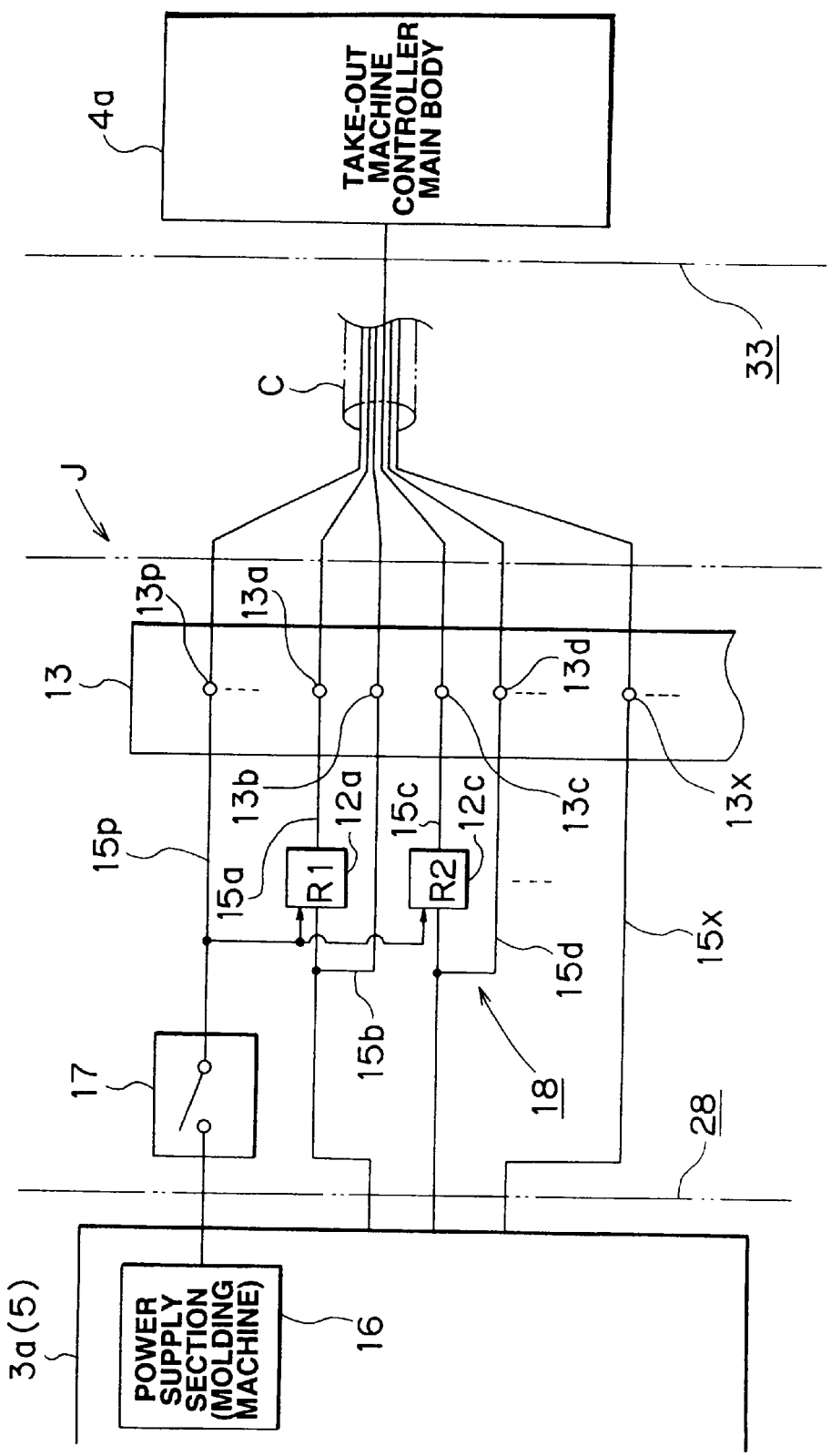
FIG. 4 is an electrical circuit diagram of a take-out machine connection apparatus provided in the molding system.

FIG. 4 shows the configuration of the take-out machine connection apparatus J. The take-out machine connection apparatus J includes a terminal block 13 disposed within the machine base 20. The terminal block 13 has a plurality of terminals 13p, 13a, 13b, 13c, 13d, 13x, etc. Individual lines of the connection cable C are connected to the corresponding terminals 13p, 13a, 13b, 13c, 13d, 13x, etc. Reference numeral 15p denotes a power supply line for establishing connection between a power supply section 16 of the molding machine Mo and the terminals 13p, etc. A first switch 17 serving as a first switching section is interposed in the power supply line 15p in order to open and close the power supply line 15p. An on-off switch is used for the first switch 17 and is disposed on the front panel portion 25f as shown in FIG. 2. This enables an operator to open and close the first switch 17 manually. In FIG. 4, the power supply line 15p is shown as being formed of a single wire. However, in general, the power supply line 15p is formed of two or three wires.

Reference numerals 15a, 15b, 15c, 15d, etc. each denote an interlock signal line for establishing connection between the terminals 13a, 13b, 13c, 13d, etc. and a controller main body 3a of the molding machine controller unit 28 and corresponding input-output ports of the man-machine interface 5. Relays 12a, 12c, etc., serving as a second switch section 18, are interposed in the interlock signal lines 15a, 15c, etc. When the first switch 17 is switched to an open side, the relays 12a, 12c, etc. cancel the interlock between the molding machine Mo and the take-out machine R. In FIG. 4, only two sets of interlock signal lines 15a (15b) and 15c (15d) are shown. However, as shown in FIG. 5, there exist four or more sets of interlock signal lines 15a (15b), etc., such as a "mold clamp interlock line," a "mold open interlock line," a "cycle start line," an "ejector advancement start line," and an "other interlock line." Note that non-interlock signal lines 15x, etc. which are not used for interlocking are connected directly to the controller main body 3a of the molding machine controller unit 28 and corresponding input-output ports of the man-machine interface 5.

The above-described take-out machine connection apparatus J functions as follows. When the first switch 17 is switched to the closed side (ON side), the power supply line 15p enters a connected state, so that electricity is supplied from the power supply section 16 of the molding machine Mo to the take-out machine R via the power supply line 15p, the terminal 13p, and the connection cable C. Upon supply of electricity, the relays 12a, 12c, etc. are excited, whereby the switch sections of the relays 12a, 12c, etc. are opened. As a result, the interlock signal lines 15a, 15c, etc. are opened, so that the molding machine Mo and the take-out machine R are interconnected by means of an interlock circuit.

Meanwhile, when the first switch 17 is switched to the opened side (OFF side), the power supply line 15p enters a broken state, so that the supply of electricity to the take-out machine R is stopped, and the excitation of the relays 12a, 12c, etc. is cancelled. As a result, the switch sections of the relays 12a, 12c, etc. are closed, and thus, the interlock signal lines 15a, 15c, etc. are closed, so that the interlock between the molding machine Mo and the take-out machine R is cancelled. FIG. 5 shows the relation between open/close states (ON/OFF states) of the first switch 17 and open/close states of the interlock signal lines 15a, 15c, etc.

Therefore, use of the take-out machine connection apparatus J as described above enables an operator to start and stop supply of electricity to the take-out machine R through operation of the first switch 17 and to establish and cancel the interlock between the molding machine Mo and the take-out machine R simultaneously with the start and stop of supply of electricity. Therefore, useless consumption of electric power can be eliminated. Further, since a connection cable with a connector or plug, a dummy plug, etc. become unnecessary, cumbersome attachment and removal work can be eliminated, and costs can be reduced through a reduction in the number of components. In addition, since no projections are present on the outer surface of the molding machine Mo, the external appearance (i.e., product value) of the molding machine Mo can be improved.

FIG. 3 shows a block diagram of the control system of the molding system M. In FIG. 3, reference numeral 28 denotes a molding machine controller unit provided within the machine base 20 of the molding machine Mo. The molding machine controller unit 28 includes a controller main body 3a, a man-machine interface 5, and a molding machine memory 3b, which in combination function as a computer processing section. The controller main body 3a and the molding machine memory 3b constitute a molding machine controller 3. The operation section 2 attached to the front panel portion 25f is connected to the man-machine interface 5. In the present embodiment, the controller main body 3a functions as a programmable logic controller (PLC) for mainly performing sequence control, and includes a CPU, a communication interface, a power supply 16, etc.

Meanwhile, the take-out machine controller unit 33 of the take-out machine R includes a controller main body 4a and a take-out machine memory 4b, which in combination function as a computer processing section. The controller main body 4a and the take-out machine memory 4b constitute a take-out machine controller 4. The pendant cable 34 of the above-described operation pendant 6 is connected to the controller main body 4a via a connector 47. The above-described cable C, which is extended from the take-out machine controller unit 33, is connected to the molding machine controller unit 28 via the take-out machine connection apparatus J provided in the molding machine Mo. In the present embodiment, the connection cable C includes a main connection line Lm for connecting the controller main body 4a of the take-out machine controller unit 33 and the controller main body 3a of the molding machine controller unit 28, and an auxiliary line Ls for connecting the connector 47 and the man-machine interface 5.

Figure 1:
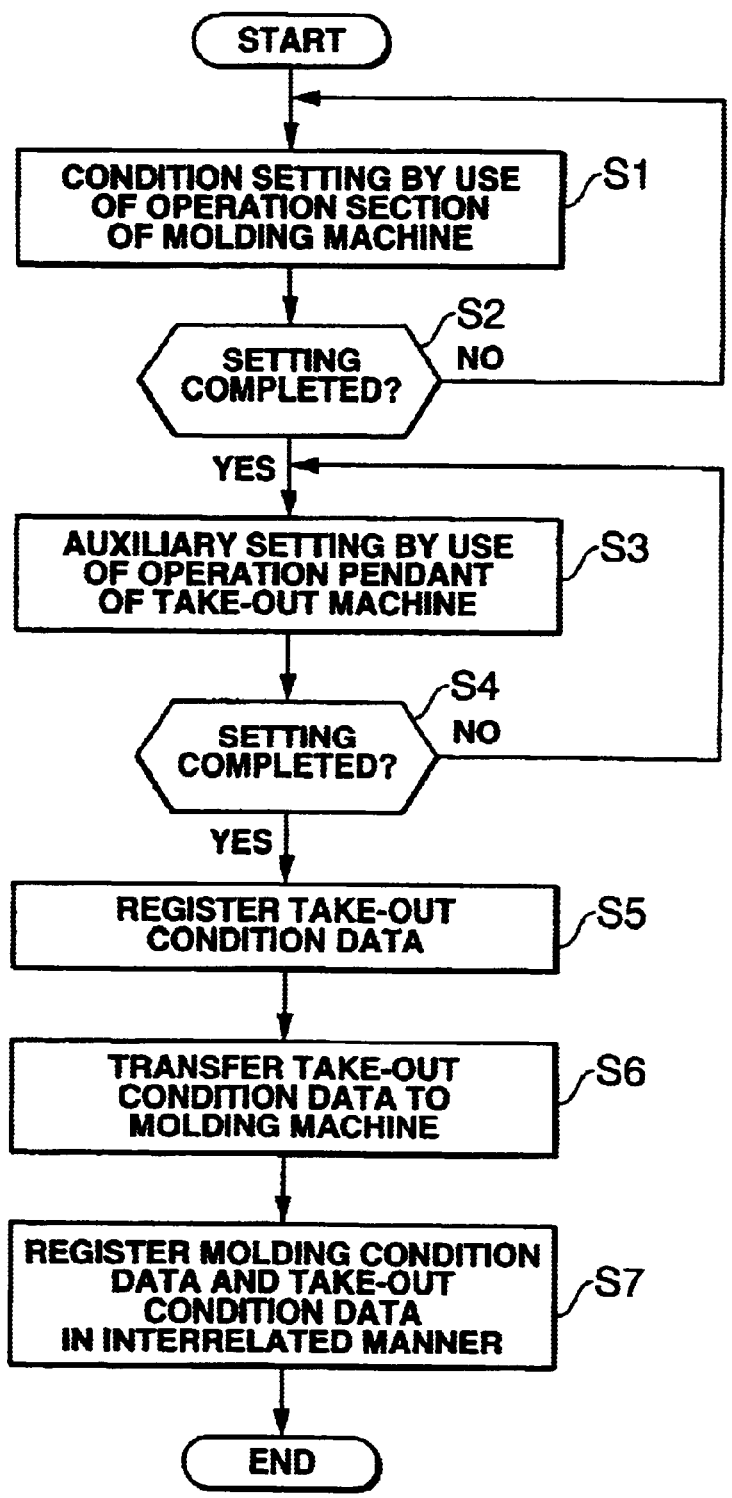
FIG. 1 is a flowchart showing the steps of a data registration method for a molding system according to an embodiment of the present invention.

Next, a data registration method according to the present embodiment will be described in accordance with the flowchart of FIG. 1 and with reference to the remaining drawings.

First, an operator sets molding conditions for the molding machine Mo and take-out conditions for the take-out machine R by use of the operation section 2 of the molding machine Mo (step S1). In the present embodiment, since the man-machine interface 5 and the controller main body 4a of the take-out machine controller unit 33 are interconnected by means of the auxiliary line Ls, the man-machine interface 5 can access not only the controller main body 3a of the molding machine controller unit 28, but also the controller main body 4a of the take-out machine controller unit 33. Therefore, the operator can set (change, add, or delete) both the molding conditions of the molding machine Mo and the take-out conditions of the take-out machine R by use of the operation section 2 of the molding machine Mo. Since the molding conditions of the molding machine Mo and the take-out conditions of the take-out machine R are closely related to each other, through realization of the above-described setting of the molding conditions and the take-out conditions by use of the operation section 2, setting, adjusting, etc. of the molding conditions and the take-out conditions can performed easily and quickly, and setting errors can be avoided.

After completion of setting operation by use of the operation section 2, the operator performs auxiliary setting for the take-out machine R by use of the operation pendant 6 (steps S2 and S3). In the present embodiment, the auxiliary setting is performed to mainly correct and change (perform fine adjustment of) teaching data for the take-out machine R. As described above, through realization of the operation of setting the molding conditions and the take-out conditions by use of the operation section 2, the setting work can be facilitated and can be performed quickly. However, if the operator cannot perform setting operation at all on the take-out machine R side (by use of the operation pendant 6), correction/change work for finely adjusting the motion of the take-out machine R while checking (observing) the motion of the take-out machine R from a proper position and angle becomes extremely inconvenient. In view of this, the control system is designed to allow the operator to correct and change the teaching data shown in FIG. 6 by use the operation pendant 6. Therefore, after completion of setting of the molding conditions and the take-out conditions (teaching data) by use of the operation section 2, the operator can perform easily and accurately the correction and change (fine adjustment) of teaching data (i.e., data regarding positions, speeds, and timers shown in FIG. 6) for the take-out machine R by use of the operation pendant 6 held in the operator's hand, while checking (observing) the motion of the take-out machine R from a proper position and angle.

After completion of the operation for correction and change (auxiliary setting), the take-out condition data having been set, corrected, or changed are registered in the take-out machine memory 4b through control of the take-out machine controller unit 33 (steps S4 and S5). As result, in each molding cycle, the take-out machine R is driven and controlled on the basis of the registered take-out condition data. Further, a data transmission instruction is output from the molding machine controller unit 28. In response to this transmission instruction, the take-out condition data are transmitted from the take-out machine R to the controller main body 3a of the molding machine controller unit 28 (step S6). Upon reception of the take-out condition data, the controller main body 3a registers the take-out condition data in the molding machine memory 4b while relating them to the molding condition data having already been set. In other words, the molding condition data and the take-out condition data are registered in the form of a set (step S7). The registration method as described above solves the drawbacks involved in the case in which the molding condition data are stored in the molding machine memory 3b and the take-out condition data are registered in the take-out machine memory 4b, and the registered data regarding molding conditions and take-out conditions are to be used again; e.g., eliminates the cumbersome work for searching corresponding molding conditions data from the molding machine memory and corresponding take-out conditions data from the take-out machine memory, and for independently changing the molding conditions data and the take-out conditions data; a resultant decrease in work efficiency; and occurrence of operational errors.

While the present invention has been described with reference to the preferred embodiment, the present invention is not limited thereto. Regarding structural details, shape, circuit configuration, data items, quantity, and method, among other aspects, modifications and any omission or addition may be possible as needed without departing from the scope of the invention. For example, the molding machine Mo and the take-out machine R are not limited to those described above. The present invention is applicable irrespective of types of the molding machine and the take-out machine, insofar as similar effects can be attained.

What is claimed is:

1. A data registration method for a molding system including a molding machine and a take-out machine for taking molded products out of the molding machine, the method comprising the steps of:

setting molding conditions for the molding machine;

setting take-out conditions for the take-out machine, the take-out conditions corresponding to the molding conditions;

recording data of the molding conditions and corresponding data of the take-out conditions in a memory unit of the molding machine, and;

manually performing a correction-change operation with an operations pendant to correct or change the take-out conditions.

2. A data registration method according to claim 1, wherein a man-machine interface connected to an operation section of the molding machine is connected to a controller of the molding machine and a controller of the take-out machine; and the operation pendant provided for the take-out machine is connected to the controller of the take-out machine and the man-machine interface.

3. A data registration method according to claim 2, wherein both the molding conditions and the take-out conditions are set by use of the operation section.

4. A data registration method according to claim 3, wherein the correction-change operation is a fine adjustment performed while motion of the take-out machine is checked.

5. A data registration method according to claim 3, wherein after completion of the correction-change operation, the corrected or changed data of the molding conditions and the corresponding data of the take-out conditions are recorded in the memory unit of the molding machine.

6. A data registration method according to claim 3, wherein after completion of the correction-change operation, the corrected or changed data of the take-out conditions are recorded in a memory unit provided in the take-out machine.

* * * * *